US 7,227,866 B2

(12) United States Patent
Romanko

(10) Patent No.: US 7,227,866 B2
(45) Date of Patent: Jun. 5, 2007

(54) FAST WORK-CONSERVING ROUND ROBIN SCHEDULING

(75) Inventor: Jeffery David Romanko, Ottawa (CA)

(73) Assignee: Tropic Networks Inc., Kanata, Ontario (CA)

( * ) Notice: Subject to any disclaimer, the term of this patent is extended or adjusted under 35 U.S.C. 154(b) by 1041 days.

(21) Appl. No.: 10/273,857

(22) Filed: Oct. 21, 2002

(65) Prior Publication Data

US 2004/0076169 A1    Apr. 22, 2004

(51) Int. Cl.
*H04L 12/56*    (2006.01)
*H04L 12/43*    (2006.01)

(52) U.S. Cl. .................. 370/395.42; 370/412; 370/458

(58) Field of Classification Search ........... 370/395.42, 370/412, 458, 395.21, 429
See application file for complete search history.

(56) References Cited

U.S. PATENT DOCUMENTS

| | | | | |
|---|---|---|---|---|
| 6,556,571 B1 * | 4/2003 | Shahrier et al. | ......... | 370/395.4 |
| 7,054,330 B1 * | 5/2006 | Chou et al. | ................. | 370/462 |
| 2004/0090974 A1 * | 5/2004 | Balakrishnan et al. | ...... | 370/412 |
| 2004/0179535 A1 * | 9/2004 | Bertagna | ................ | 370/395.21 |

OTHER PUBLICATIONS

Nutt, G., "Operating Systems: A Modern Perspective", published by Addison Wesley Higher, Jul. 18, 2001.
Wakerly, J.F., "Digital Design Principles and Practices", 2nd edition, Prentice-Hall Inc., Englewood Cliffs, New Jersey, USA, published in 1994 and 1990.

* cited by examiner

*Primary Examiner*—Wing Chan
*Assistant Examiner*—Feben Micael Haile
(74) *Attorney, Agent, or Firm*—Victoria Donnelly

(57) ABSTRACT

The invention provides a method and system for fast scheduling using a work-conserving Round Robin strategy. The method and system select one of a plurality of queues of data packets for switching it to an output port in a current timeslot, for achieving work-conserving Round Robin scheduling. The method is based on a consideration range for each queue that is a set of queues having priority over the given queue. The method comprises the steps of generating a mask for a given queue for masking all queues outside a consideration range of the given queue and applying the mask and a queue ready flag for the given queue for determining if the given queue is to be selected in the current time slot.

12 Claims, 5 Drawing Sheets

FAST WORK-CONSERVING ROUND ROBIN SCHEDULING

FIELD OF INVENTION

The invention relates to a system and method for work-conserving round robin scheduling.

BACKGROUND OF THE INVENTION

Round Robin (RR) is a well-known strategy for scheduling multiple requests for a common resource, see e.g. "Operating Systems—a Modern Perspective" by G. Nutt, $2^{nd}$ edition, published by Addison Wesley Higher, Jul. 18, 2001. If there are K contenders for a resource then RR allocates the resource to each of the contenders for a fixed duration (called time slice) at a time. When the time slice allocated to the current contender "i" is over, the resource is allocated to the next contender "i+1" and so on. The allocation of the resource is performed in a circular fashion. It is allocated to contender 1 first followed by 2 and so on. When the time slice for contender K is over, the resource is allocated to contender 1 again. At a given point in time, the contenders for a resource may or may not be ready for using the resource. If a resource is allocated to a contender when its turn arrives, irrespective of whether or not the contender is ready, the strategy is called non-work-conserving round robin; whereas if a resource is allocated to a contender if and only if it is ready, the strategy is called a work-conserving round robin.

RR has been used in a number of different situations including switching of data arriving at multiple queues to a common outgoing port. A typical implementation of such an RR strategy is based on the well-known priority encoder principle (also known as daisy chaining principle), see e.g. "Digital Design Principles and Practices 2nd Edition" by John F. Wakerly published in 1994 and 1990, Prentice-Hall, Inc. Englewood Cliffs, N.J. However the delay achieved with such an approach is directly proportional to the number of contenders. Thus the delay achieved with a high number of queues that are to be multiplexed to an outgoing port may become too high for use in a high-speed data switching system.

SUMMARY OF THE INVENTION

The invention provides a method and system for fast scheduling using a work-conserving Round Robin strategy. The scheduling overhead using a classical daisy chain approach is directly proportional to the number of queues in the system. This invention reduces the scheduling overhead significantly and is thus applicable to systems with a large number of queues.

A method is provided for selecting one of a plurality of queues of data packets, and switching it to an output port in a current timeslot, for achieving work-conserving Round Robin (RR) scheduling, the method comprising the steps of generating a mask for a given queue for masking all queues outside a consideration range of the given queue; and applying the mask and a queue ready flag for the given queue for determining if the given queue is to be selected for switching to the output port in the current timeslot; wherein the consideration range is a set of queues having priority over the given queue.

The step of generating a mask for the given queue, further comprises the steps of: generating the consideration range for the given queue; setting an Nth bit in said mask for the given queue to 1, if a queue with index N is in the consideration range of the given queue; and setting an Nth bit in said mask for the given queue to 0, if the queue with an index N is outside the consideration range of the said queue.

Generating the consideration range of the given queue, further comprises a step of assigning a set of queues with indices higher than the index of a queue, served in a previous timeslot, but lower than the index of said queue, to the consideration range of said queue, if the given queue has a higher index than the index of the queue served in the previous time slot. If the given queue has a lower index than the index of the queue served in the previous timeslot, the set of queues with indices higher than the index of the queue served in the previous timeslot, as well as the set of queues with indices lower than the index of said queue, are assigned to the consideration range of the given queue.

The queue ready flag is set to 1, if the given queue is non-empty, and to 0 if the given queue is empty.

The step of applying the masks and the queue ready flags, further comprises the steps of applying an AND operation on the queue ready flags with the mask for the given queue; applying a Bitwise NOR operation on each of the results of the And operations; combining the result of the Bitwise NOR operation for each queue with the corresponding queue ready flag; and storing the result in a service bit for the given queue.

A system is provided for selecting one of a plurality of queues of data packets for switching to an output port, in a current timeslot, for achieving work-conserving Round Robin scheduling for the system, comprising means for generating a mask for a given queue for masking all queues outside a consideration range of the given queue; and means for applying the mask and a queue ready flag for the given queue for determining if the given queue is to be selected for switching to the output port in the current timeslot; wherein the consideration range is a set of queues having priority over the given queue.

The system further comprises means for generating the consideration range of the given queue; means for setting an Nth bit in said mask for the given queue to 1, if a queue with an index N is in the consideration range of the given queue; and means for setting an Nth bit in said mask for the given queue to 0, if the queue with an index N is outside the consideration range for the said queue.

Means for generating the consideration range of the given queue further comprises, means for assigning the set of queues with indices higher than the index of a queue, served in a previous timeslot, but lower than the index of said queue, to the consideration range of said queue; wherein the given queue has a higher index than the index of the queue served in the previous timeslot.

Means for generating the consideration range of the given queue further comprises, means for assigning the set of queues with indices higher than that of the queue, served in the previous timeslot, as well as the queues with indices lower than the index of the given queue, to the consideration range of said queue, wherein the given queue has a lower index than the index of the queue served in the previous timeslot.

The queue ready flag is set to 1, wherein the queue is non-empty and is set to 0, wherein the queue is empty.

Means for application of the masks and queue ready flags, further comprises, means for applying an AND operation on the queue ready flags with the mask for said queue; means for applying a Bitwise NOR operation on each of the results of the And operations; means for combining the result of the Bitwise NOR operation for each queue with its queue ready flag; and means for storing the result in the service bit for said queue.

BRIEF DESCRIPTION OF THE DRAWINGS

Further features and advantages of the invention will be apparent from the following description of the embodiment, which is described by way of example only and with reference to the accompanying drawings, in which.

DETAILED DESCRIPTION OF THE INVENTION

This invention is concerned with a method and system for implementing a work-conserving RR in a system consisting of no_q queues each containing packets of data to be switched to a common output port. Each queue is to be switched to the output port using this RR strategy. As explained in the previous section the port is allocated to a queue for a single time slice. Note that a time slice in this case corresponds to a cell slot. Once the time slice for a queue is over, the port is allocated to the next ready queue. The method for selecting the next queue in line is based on a consideration range associated with each queue. A consideration range for a queue is a set of queues that have priority over the given queue. It includes all the queues that are between the last queue that was served (referred to by its index last_q) and the queue for which (referred to by its index this_q) the consideration range is being computed. If any of the queues in the consideration range is ready (non-empty), the current queue will not be allocated the port. For example, if this last_q is 10 and this_q is 15, queues 11, 12, 13, and 14 will constitute the consideration range and will have priority over queue 15. If this_q is smaller than last_q, and is equal to 5 for example, then the consideration range wraps around and consists of queues 11, . . . no_q and 1 . . . 4.

Figure 1:
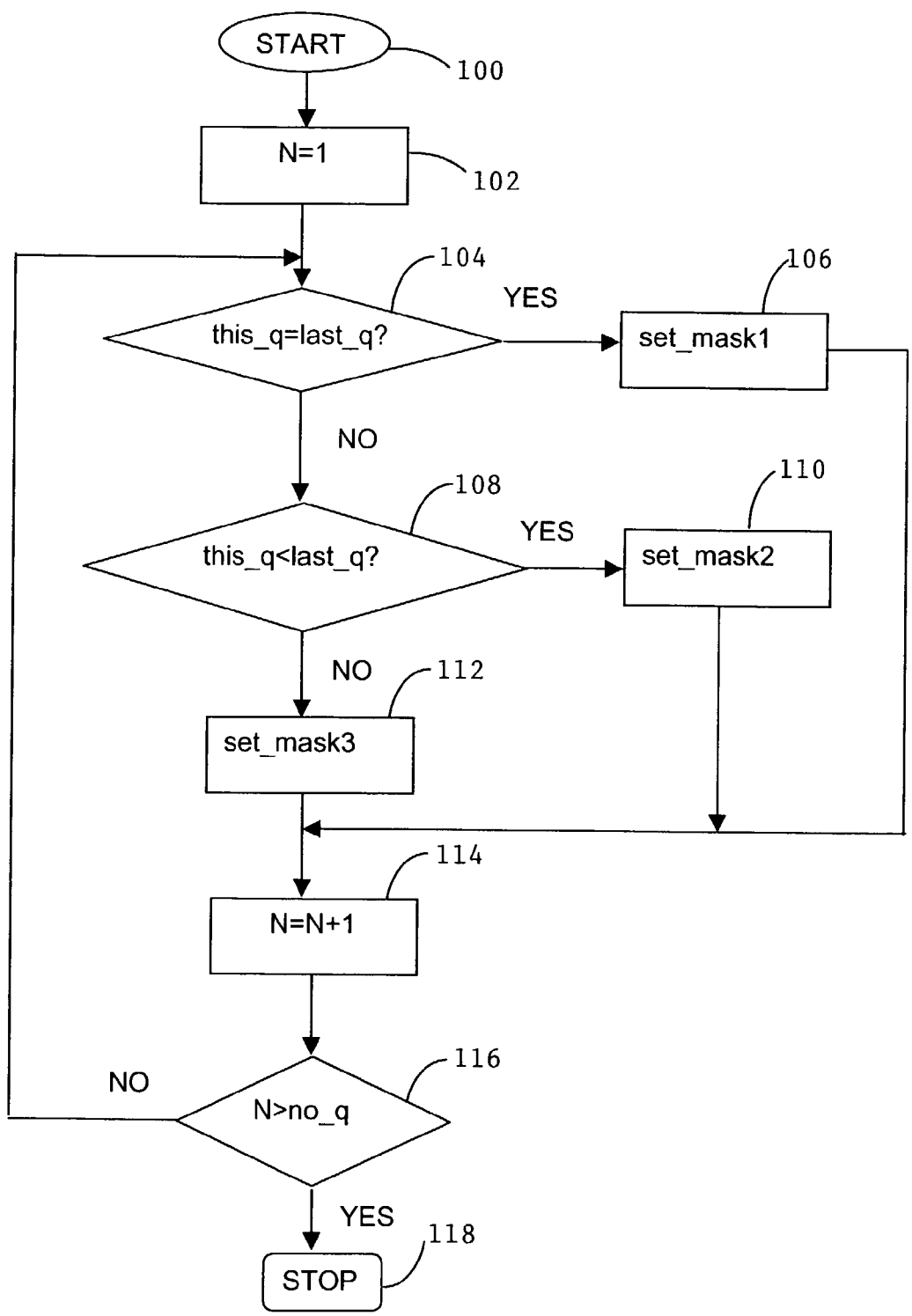
FIG. 1 illustrates the steps of generation of masks for the queues.

The method includes two important components. The first is concerned with the generation of a mask from each queue that will mask all queues other than those in the consideration range for the given queue. The second is concerned with the application of these masks and the queue ready flags for selecting the current queue that will be allocated the output port. The queue ready flag for a queue indicates the state of the queue: it is set to "1" when the queue in non-empty and to "0" otherwise. The first component is explained with the help of a flow chart presented in FIG. 1. The procedure presented in FIG. 1 is executed for each queue in the system. The output of the procedure is a vector range_mask[N] the Nth bit in which is set if the queue with index N is in the consideration range for the queue for which the mask is being generated. Upon start (box 100) the procedure begins execution of a "for loop" by setting the value of a loop count variable N to 1 (box 102). The index of the current queue this_q is compared with last_q, which is the index of the last queue served (box 104). If they are equal the procedure exits "Yes" from box 104 and procedure set_mask1 (box 106) is executed. Otherwise the procedure exits "No" from box 104. If this_q is less than last_q then the procedure exits "Yes" from box 108 and procedure set_mask2 is executed (box 110). Otherwise the procedure exits "No" from box 108 and the procedure set_mask3 is executed (box 112). At the end of the loop, the loop count variable N is incremented (box 114) and its value is compared with the total number of queues in the system (no_q) in box 116. If N is greater than no_q the procedure exits "Yes" from box 116 and stops (box 118). Otherwise the procedure exits "No" from box 116 and another iteration of the loop is started.

Figure 2:
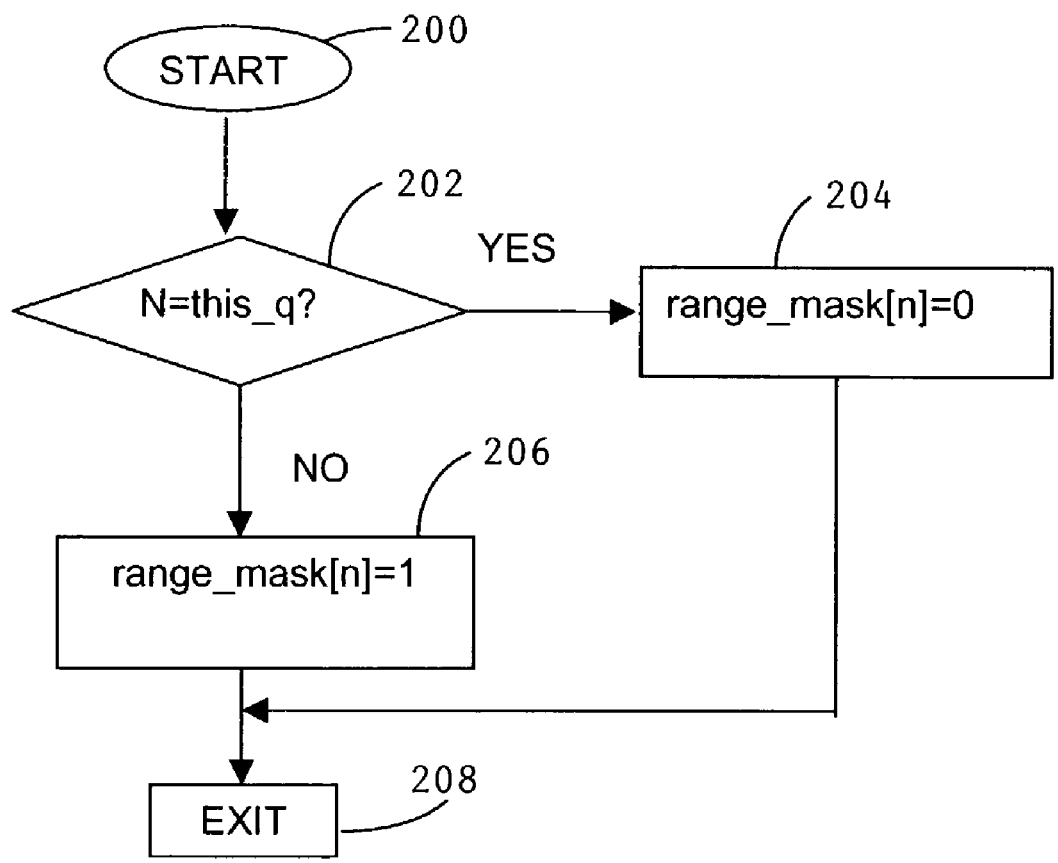
FIG. 2 shows in more detail the step 106 of FIG. 1 for handling the case in which the index of a given queue is equal to the index of the queue served in the previous time slot.

Procedure set_mask1 is explained with the flowchart presented in FIG. 2. Upon start (box 200) N is compared with the index of the current queue, this_q. If they are equal, the procedure exits "Yes" from box 202. This corresponds to a situation in which the queue with index N is not in the consideration range, for the queue with index this_q and range_mask[N] is set to "0" (box 204) before the procedure terminates (box 208). Otherwise, the queue with the index of N is in the consideration range and range_mask[N] is set to "1" (box 206) before the procedure terminates (box 208).

Figure 3:
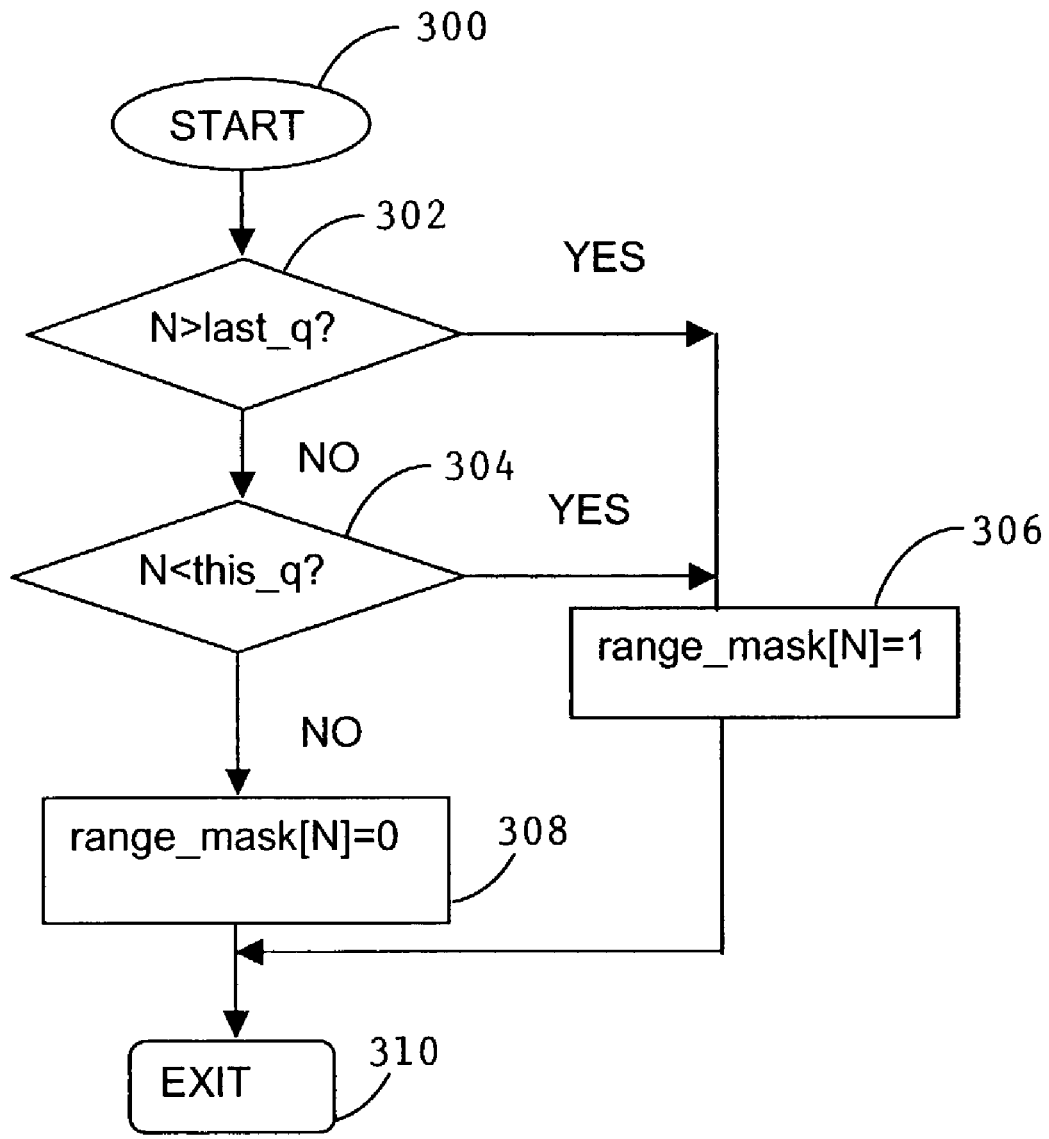
FIG. 3 shows in more detail the step 110 of FIG. 1 for handling the case in which the index of a given queue is less than the index of the queue served in the previous time slot.

Procedure set_mask2 is explained with the help of FIG. 3. Upon start (box 300) N is compared with last_q (box 302). If N is greater than last_q the procedure exits "Yes" from box 302. This corresponds to a situation in which the queue with index N is in the consideration range and range_mask [N] is set to "1" (box 306) before the procedure terminates (box 310). If N is not greater than last_q the procedure exits "No" from box 302 and N is compared with this_q (box 304). If N is lower than this_q then the queue with index N is in the consideration range and the procedure exits "Yes" from box 304; for the queue with index this_q and range_mask[N] is set to "1" (box 306) before the procedure stops (box 310). Otherwise, the queue with index N is not in the consideration range and the procedure exits "No" from box 304; range_mask[N] is set to "0" (box 308) before the procedure terminates (box 310).

Figure 4:
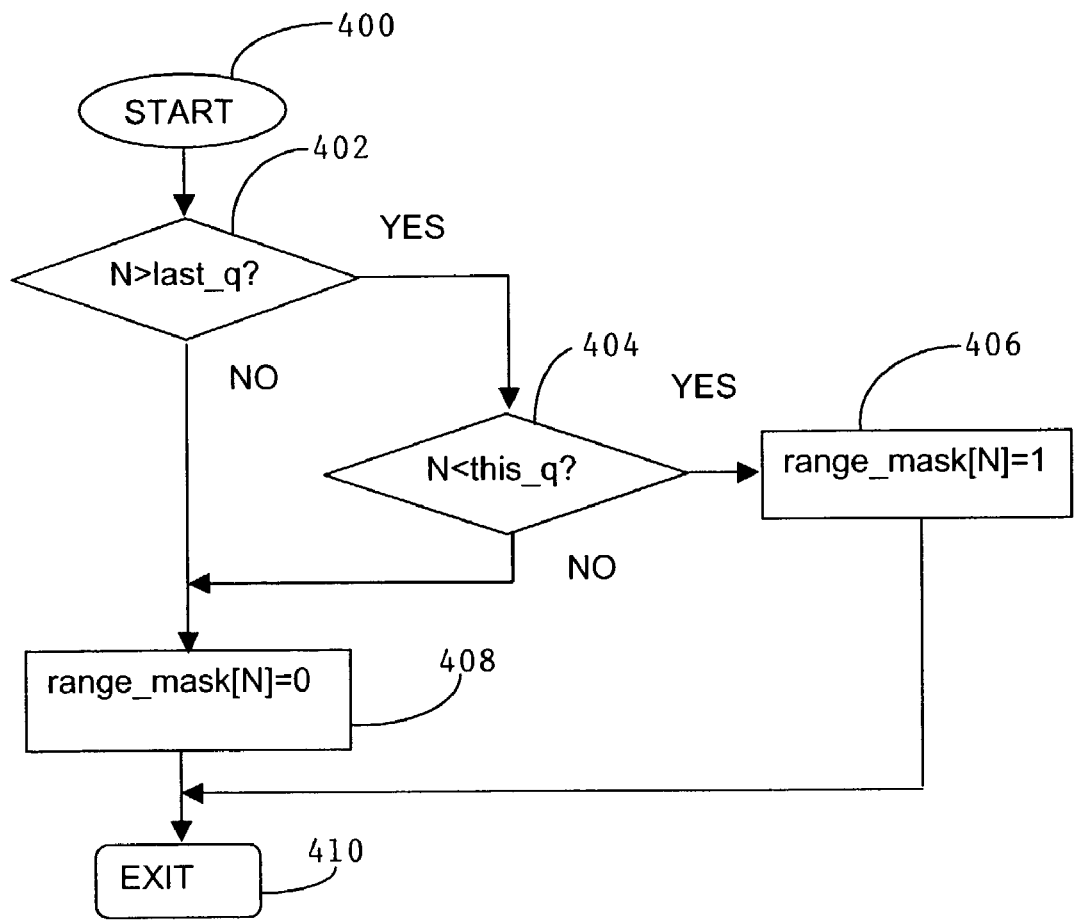
FIG. 4 shows in more detail the step 112 of FIG. 1 for handling the case in which the index of a given queue is higher than the index of the queue served in the previous time slot.

Procedure set_mask3 is explained with the help of a flow chart presented in FIG. 4. Upon start (box 400) N is compared with last_q (box 402). If N is larger than last_q the procedure exits "Yes" from box 402. Otherwise the queue with index N is not in the consideration range for the queue with index this_q and range_mask[N] is set to "0" (box 408) before the procedure terminates (box 410). When the procedure exits "Yes" from box 402, N is compared with this_q (box 404). If N is lower than this_q, the queue with index N is in the consideration range and the procedure exits "Yes" from box 404. range_mask[N] is set to "1" (box 406) before the procedure terminates (box 410). Otherwise the procedure exits "No" from box 404; range_mask[N] is set to "0" (box 408) and the procedure terminates (box 410).

Figure 5:
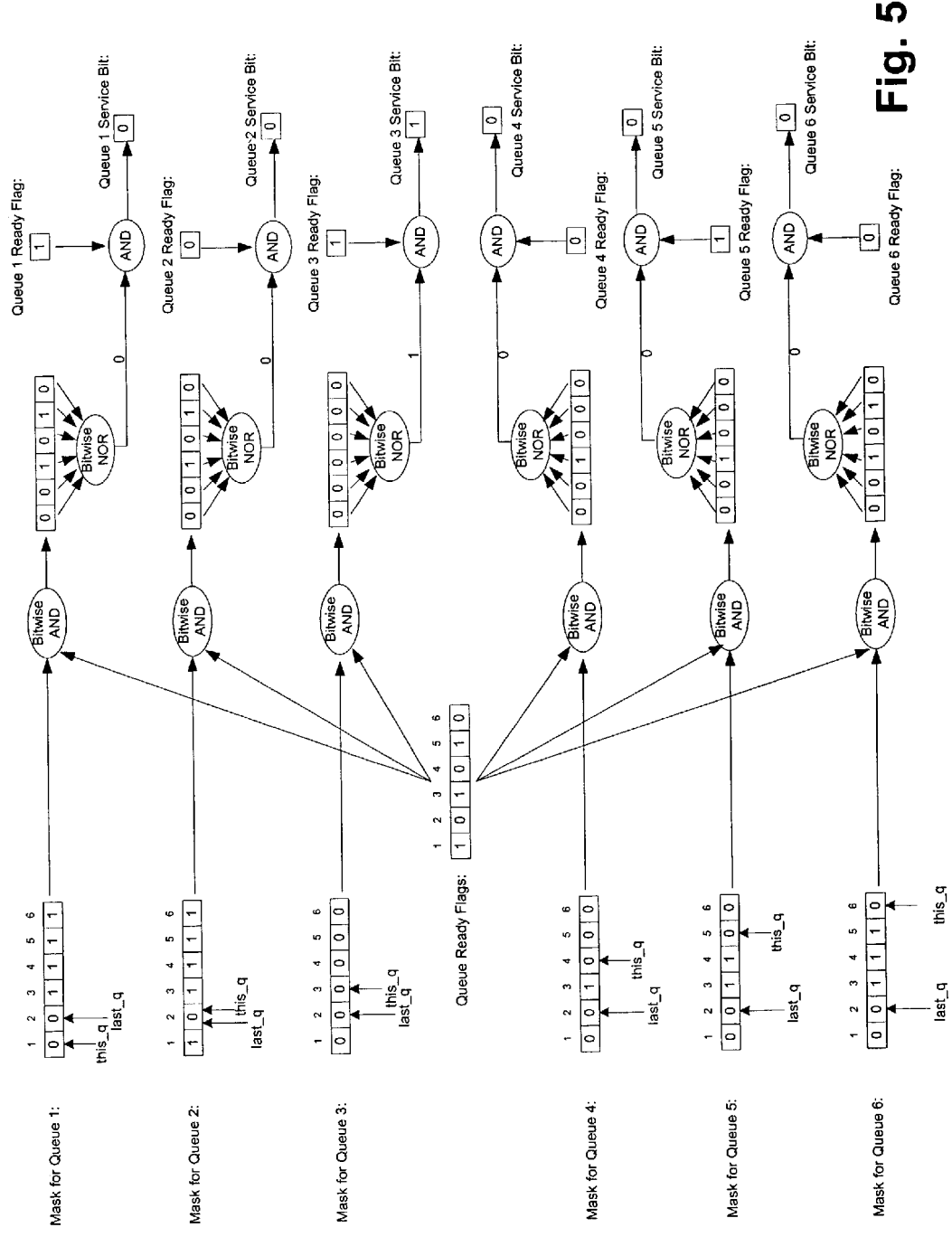
FIG. 5 presents an example for illustrating the selection of a queue that is to be allocated to the output port in the current time slot.

The selection of the queue that is to be allocated to the output port in the current time slot is explained with the help of an example provided in FIG. 5. The figure displays a system with six queues (no_q=6). Each queue "i" (i=1 . . . 6) is associated with a mask register and range_mask[N] for this register refers to the Nth bit in the register. The queue ready flag and service bit for queue "i" are shown in FIG. 5 as Queue i Ready Flag and Queue i Service Bit respectively.

The index of the last queue that was served is last_q, whereas this_q is the index of the queue under consideration. The system state captured in FIG. 5 corresponds to last_q equal to 2. The Queue Ready flags represent the status of each queue: it is set to "1" if the queue is non-empty and to "0" otherwise. The ANDing of the Queue Ready flags with the mask for a given queue produces an output in which bit[N] is 1 if and only if the queue with index N is ready (non-empty) and lies in the "consideration range" for the given queue. Bit[N] is set to "0" otherwise.

The results of the ANDing operations are shown in FIG. 5. Each of these results of the ANDing operations undergoes a Bitwise NOR operation. Since only the result corresponding to Queue 3 is equal to 1 and Queue 3 Ready Flag is also 1, Queue 3 is selected for being switched to the output port in the current timeslot and the Queue 3 Service Bit is set to "1". The Service Bits for all the other queues are set to "0".

For the classical daisy chain approach the number of sequential operations required to select a queue for servicing from no_q queues is no_q−1. As can be seen from FIG. 5, once the consideration range mask is generated the number of sequential operations required to finally select a queue for servicing with this approach is $2 \log_2(no\_q-1)+1$. That is $\log_2(no\_q-1)$ for the bitwise ANDing, $\log_2(no\_q-1)$ for the bitwise NORing and 1 for the final And.

Numerous modifications and variations of the present invention are possible in light of the above teaching. It is therefore to be understood that within the scope of the appended claims, the invention may be practiced otherwise than as specifically described herein. One such modification is achieved by using a method based on lookup tables. The consideration range masks are determined offline through the procedure presented in FIGS. 1 through 4. These masks are stored in lookup tables, allowing improved performance. The no_q−1 masks possible for a specific value of this_q and no_q−1 possible values of last_q can be stored in a table for each queue. The table associated with a given value of this_q is indexed in each time slice with the current value of last_q, quickly providing the consideration range mask to be used. Hence the steps for generating the consideration range mask shown in the FIG. 1 through FIG. 4 do not need to be performed in real time. This leads to a reduction in time for selection of the queue to be switched to the output port in the current time slice. The improvement in speed is accompanied by only a moderate increase in storage requirement. A total number of no_q lookup tables are required with no_q locations per table. Thus a total of $no\_q^2$ locations are required for storing the pre-computed values of the masks.

What is claimed is:

1. A method for selecting one of a plurality of queues of data packets, for switching to an output port in a current timeslot, for achieving work conserving Round Robin (RR) scheduling, the method comprising the steps of:
   generating a mask for a given queue for masking all queues outside a consideration range of the given queue; and
   applying the mask and a queue ready flag for the given queue for determining if the given queue is to be selected for switching to the output port in the current timeslot;
   wherein the consideration range is a set of queues having priority over the given queue;
   wherein the step of generating a mask for the given queue, comprising the steps of:
   generating the consideration range for the given queue;
   setting an Nth bit in said mask for the given queue to 1, if a queue with index N is in the consideration range of the given queue; and
   setting an Nth bit in said mask for the given queue to 0, if the queue with an index N is outside the consideration range of the said queue;
   wherein generating the consideration range of the given queue, comprising a step of:
   assigning a set of queues with indices higher than the index of a queue served in a previous timeslot, but lower than the index of said queue, to the consideration range of said queue;
   wherein the given queue has a higher index than the index of the queue served in the previous time slot.

2. A method for selecting one of a plurality of queues of data packets, for switching to an output port in a current timeslot, for achieving work conserving Round Robin (RR) scheduling, the method comprising the steps of:
   generating a mask for a given queue for masking all queues outside a consideration range of the given queue; and
   applying the mask and a queue ready flag for the given queue for determining if the given queue is to be selected for switching to the output port in the current timeslot;
   wherein the consideration range is a set of queues having priority over the given queue;
   wherein the step of generating a mask for the given queue, comprising the steps of:
   generating the consideration range for the given queue;
   setting an Nth bit in said mask for the given queue to 1, if a queue with index N is in the consideration range of the given queue; and
   setting an Nth bit in said mask for the given queue to 0, if the queue with an index N is outside the consideration range of the said queue;
   wherein generating the consideration range of the given queue comprising a step of:
   assigning the set of queues with indices higher than the index of the queue served in the previous timeslot, as well as the queues with indices lower than the index of said queue, to the consideration range of the given queue;
   wherein the given queue has a tower index than the index of the queue served in the previous timeslot.

3. A method as claimed in claim 1, wherein the queue ready flag is set to 1, if the given queue is non-empty.

4. A method as in claim 1, wherein the queue ready flag is set to 0, if the given queue is empty.

5. A method as claimed in claim 1, wherein the step of applying the masks and the queue ready flags, further comprising the steps of:
   applying an AND operation on the queue ready flags with the mask for the given queue;
   applying a Bitwise NOR operation on each of the results of the And operations;
   combining the result of the Bitwise NOR operation for each queue with the corresponding queue ready flag; and
   storing the result in a service bit for the given queue.

6. A method as claimed in claim 5, wherein the step of storing the result further comprising the steps of:
   storing a 1 in the service bit of only one of the plurality of queues, when the given queue is selected for switching to the output port, in the current timeslot; and
   storing a 0 in the service bit of all queues other than the selected queue, in the current timeslot.

7. A system for selecting one of a plurality of queues of data packets for switching to an output port in a current timeslot, for achieving work-conserving Round Robin scheduling, the system comprising:
 means for generating a mask for a given queue for masking all queues outside a consideration range of the given queue; and
 means for applying the mask and a queue ready flag for the given queue, for determining if the given queue is to be selected for switching to the output port, in the current timeslot;
 wherein the consideration range is a set of queues having priority over the given queue;
the system further comprises:
 means for generating the consideration range of the given queue;
 means for setting an Nth bit in said mask for the given queue to 1, if a queue with an index N is in the consideration range of the given queue; and
means for setting an Nth bit in said mask for the given queue to 0, if the queue with an index N;
wherein the means for generation of the consideration range of the given queue further comprises:
 means for assigning the set of queues with indices higher than the index of a queue served in a previous timeslot, but lower than the index of said queue, to the consideration range of said queue;
 wherein the given queue has a higher index than the index of the queue served in the previous timeslot.

8. A system for selecting one of a plurality of queues of data packets for switching to an output port in a current timeslot, for achieving work-conserving Round Robin scheduling, the system comprising:
 means for generating a mask for a given queue for masking all queues outside a consideration range of the given gueue; and
 means for applying the mask and a queue ready flag for the given queue, for determining if the given queue is to be selected for switching to the output port, in the current timeslot;
 wherein the consideration range is a set of queues having priority over the given queue;
the system further comprises:
 means for generating the consideration range of the given queue;
 means for setting an Nth bit in said mask for the given queue to 1, if a queue with an index N is in the consideration range of the given queue; and
 means for setting an Nth bit in said mask for the given queue to 0, if the queue with an index N
wherein the means for generation of the consideration range of the given queue further comprises:
 means for assigning the set of queues with indices higher than that of the queue served in the previous timeslot as well as the queues with indices lower than the index of the given queue, to consideration range of said queue;
 wherein the given queue has a lower index than the index of the queue served in the previous timeslot.

9. A system as claimed in claim 7, the queue ready flag is set to 1;
 wherein the queue is non-empty.

10. A system as claimed in claim 7, the queue ready flag is set to 0;
 wherein the queue is empty.

11. A system as claimed in claim 7, wherein the means for application of the masks and queue ready flags, further comprises:
 means for applying an AND operation on the queue ready flags with the mask for said queue;
 means for applying a Bitwise NOR operation on each of the results of the And operations;
 means for combining the result of the Bitwise NOR operation for each queue with its queue ready flag; and
 means for storing the result in the service bit for said queue.

12. A system as claimed in claim 11, wherein the means for storing the result further comprises:
 storing a 1 in the service bit of only one of the plurality of queues, when the given queue is selected for switching to the output port in the current timeslot; and
 storing a 0 in the service bit of all queues other than the selected queue in the current timeslot.

* * * * *

UNITED STATES PATENT AND TRADEMARK OFFICE
CERTIFICATE OF CORRECTION

| | |
|---|---|
| PATENT NO. | : 7,227,866 B2 |
| APPLICATION NO. | : 10/273857 |
| DATED | : June 5, 2007 |
| INVENTOR(S) | : Jeffery Romanko |

It is certified that error appears in the above-identified patent and that said Letters Patent is hereby corrected as shown below:

Column 6, line 44, delete "tower" and insert --lower--.

Signed and Sealed this

Twenty-ninth Day of July, 2008

JON W. DUDAS
*Director of the United States Patent and Trademark Office*